United States Patent
Deodhar et al.

(10) Patent No.: US 12,443,448 B1
(45) Date of Patent: Oct. 14, 2025

(54) SYSTEM AND METHOD FOR IMPROVED DATA MIGRATION BETWEEN AN RDBMS SOURCE AND RDBMS TARGET

(71) Applicant: MORGAN STANLEY SERVICES GROUP INC., New York, NY (US)

(72) Inventors: Akshay Deodhar, Bangalore (IN); Amit Kumar Bhagat, Bangalore (IN); Ashish Vicky, Bangalore (IN); Kishore V, Chennai (IN); Naresh Kulkarni, Bangalore (IN); Avinash Balpande, Princeton Junction, NJ (US); Parham Darbandi Tehrani, Montreal (CA); Kapil Sharma, Montreal (CA)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 19/049,359

(22) Filed: Feb. 10, 2025

(51) Int. Cl.
*G06F 9/50* (2006.01)
*G06F 16/25* (2019.01)

(52) U.S. Cl.
CPC .......... *G06F 9/5016* (2013.01); *G06F 9/5038* (2013.01); *G06F 16/25* (2019.01); *G06F 2209/503* (2013.01)

(58) Field of Classification Search
CPC ...... G06F 9/5016; G06F 16/25; G06F 9/5038; G06F 2209/503
See application file for complete search history.

(56) References Cited

U.S. PATENT DOCUMENTS

| | | | |
|---|---|---|---|
| 9,344,484 B2 | 5/2016 | Ferris | |
| 10,091,297 B1 | 10/2018 | Zhao et al. | |
| 10,375,203 B2 | 8/2019 | Ferris | |
| 11,327,675 B2 | 5/2022 | Ray et al. | |
| 11,343,142 B1 | 5/2022 | Wang et al. | |
| 11,537,475 B1 | 12/2022 | Saladi et al. | |
| 11,550,811 B2 | 1/2023 | Boehmann et al. | |
| 12,147,400 B1* | 11/2024 | Sanders | G06F 16/27 |
| 2007/0280109 A1* | 12/2007 | Jaatinen | H04W 28/06 |
| | | | 370/235 |
| 2008/0283599 A1* | 11/2008 | Rasband | G06K 7/0008 |
| | | | 235/439 |
| 2012/0303739 A1 | 11/2012 | Ferris | |
| 2017/0097957 A1* | 4/2017 | Bourbonnais | G06F 16/24554 |
| 2018/0088993 A1* | 3/2018 | Gerdesmeier | G06F 9/5005 |
| 2019/0007438 A1* | 1/2019 | Viktorov | H04L 63/20 |
| 2020/0233600 A1 | 7/2020 | Ray et al. | |
| 2022/0086241 A1 | 3/2022 | Sharma et al. | |
| 2022/0092210 A1 | 3/2022 | Tucker et al. | |
| 2022/0224887 A1* | 7/2022 | Xu | H04N 19/433 |
| 2022/0229787 A1* | 7/2022 | Veluswamy | G06F 13/1668 |
| 2023/0108145 A1 | 4/2023 | Ma et al. | |
| 2024/0177245 A1* | 5/2024 | Yang | G06F 16/2358 |
| 2025/0150411 A1* | 5/2025 | Shao | H04W 4/50 |

* cited by examiner

*Primary Examiner* — Aimee Li
*Assistant Examiner* — Willy W Huaracha
(74) *Attorney, Agent, or Firm* — Weitzman Law Offices, LLC

(57) ABSTRACT

A framework for dynamically allocating and utilizing resources of a computer system for transferring data between a source RDBMS and a target RDBMS is described, as is a method of dynamically optimize allocation and utilization of system resources to efficiently transfer data between a source RDBMS and a target RDBMS.

9 Claims, 10 Drawing Sheets

SYSTEM AND METHOD FOR IMPROVED DATA MIGRATION BETWEEN AN RDBMS SOURCE AND RDBMS TARGET

FIELD OF THE INVENTION

This disclosure relates to computer systems and, more particularly, to data migration.

BACKGROUND

The exponential growth in data that organizations create has resulted in challenges in being able to migrate the data to/from different sources/targets at scale so that it can be analyzed. Those challenges include the need for complex infrastructure, data security and scalability, to name a few.

While tools for migration of large volumes of specific data exist, they have efficiency issues and, in many cases, lack data security and quality controls.

Moreover, such tools generally require "connectors" or "pipelines" to specifically be written in order to migrate data from each particular platform to some other.

SUMMARY

This disclosure describes solutions that provide significant advances in addressing the aforementioned problems.

Our solutions provide for better resource allocation and, hence, greater efficiency in the transfer operation while moving large amounts of data in parallel.

Moreover, our solution provides for pre- and post-validation of the data such that time and resources are not wasted making repeated queries for, or transferring, corrupt data.

One aspect of this disclosure involves a framework for dynamically allocating and utilizing resources of a computer system for transferring data between a source Relational Database Management System ("RDBMS") and a target RDBMS. The framework involves at least one computer having a processor, random access memory, and non-transitory memory containing program instructions implementing a Metadata Read module including, a Metadata Detail Table, a Metadata Audit Table, and a Metadata History Table. The framework further includes a preprocessing module, a data read module, a data processing module, a data write module, and a post processing module. In connection with a transferring of specified data between the source RDBMS and the target RDBMS, the Metadata Detail Table includes at least information necessary to perform object-level batch ingestion of data from the source RDBMS along with commit point and batch intervals, the Metadata Audit Table includes at least auditing information for object-level batch processing along with source and target level information and the Metadata History Table includes at least a before and after state of rows updated in the Metadata Detail Table. System resources are dynamically allocated, on an object-level basis, to facilitate reading of the specified data in batches from the source RDBMS in a parallel manner and transfer the specified data to the target RDBMS.

Another aspect of this disclosure involves a method of dynamically optimize allocation of system resources to efficiently transfer data between a source RDBMS and a target RDBMS. The method involves collecting metadata regarding object data from the source RDBMS, calculating, on an object-level basis, a necessary amount of resources needed to perform a parallel reading objects from the source RDBMS based upon a volume of data to be read, calculating on an object-level basis, a necessary amount of resources needed to perform a parallel writing of objects to the target RDBMS, performing DataFrame transformation on source DataFrames for objects of the source RDBMS to be transferred to the target, and creating an index, on an object-level basis, of tables to be transferred from the source RDBMS, with the tables being ordered for processing and transfer on a heaviest to lightest basis. The method further involves, on a first pass, a) executing parallel reads of object-level table data from the source RDBMS based upon the ordering in the index; and b) if sufficient resources are available, transferring the tables on a parallel write basis to the target DBMS, and c) if sufficient resources are not available for a particular table identified in the index, marking the particular table as having a pending status for processing in a subsequent pass and skipping the particular table by advancing to a next heaviest table listed in the index.

BRIEF DESCRIPTION OF THE DRAWINGS

This disclosure is further described in the detailed description that follows, with reference to the drawings, wherein the same reference numbers appearing in the various drawings and description designate corresponding or like elements among the different views. and in which.

DETAILED DESCRIPTION

Figure 1:
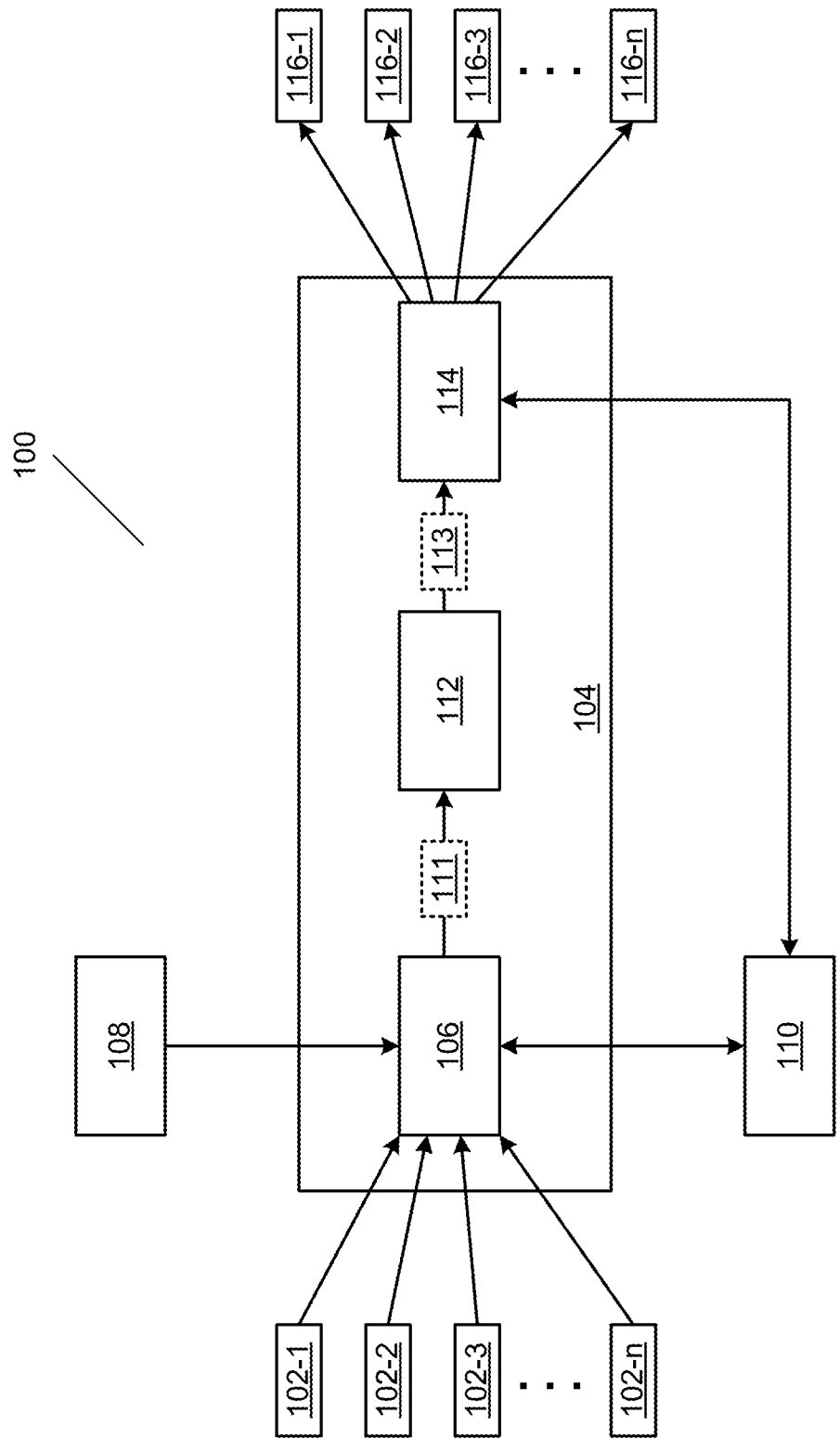
FIG. 1 illustrates, in simplified form, a simplified, high level functional overview of a process for migrating data from sources to targets in parallel in accordance with the teachings herein.

FIG. 1 illustrates, in simplified form, a simplified, high level functional overview of a process 100 for more efficiently migrating large volumes data from sources to targets (on premises to on premises or to or from public or private cloud storage) in parallel and distributed mode in accordance with the teachings herein.

In general, the process 100 involves obtaining data from one or more RDBMS source applications 102-1, 102-2, 102-3, . . . , 102-*n*, for example, IBM DB2, Sybase, Greenplum, Teradata, MS-SQL, Single-Store (MemSQL), Microsoft SQLAzure, Snowflake, etc., although, in most cases data will be obtained from a single source for transfer to a single target.

The data is obtained using a distributed data processing engine that operates as an "Extract, Transform and Load" (ETL) tool, generically referred to herein as a "transfer application" 104, which uses a unified analytics engine for large-scale distributed data processing such as Apache® Spark. A reader 106 obtains stored configuration data 108 and metadata information 110 and data from one (or more) RDBMS source applications 102-1, 102-2, 102-3, . . . , 102-n, then DataFrame transformation 112 is performed on source DataFrames 111 and the transformed DataFrames 113 are written 114 to storage for the target applications 116-1, 116-2, 116-3, . . . , 116-n, for example, Snowflake, Microsoft SQLAzure, on-premise RDBMS, etc. and pertinent metadata information 110 is re-written back to its storage.

Figure 2:
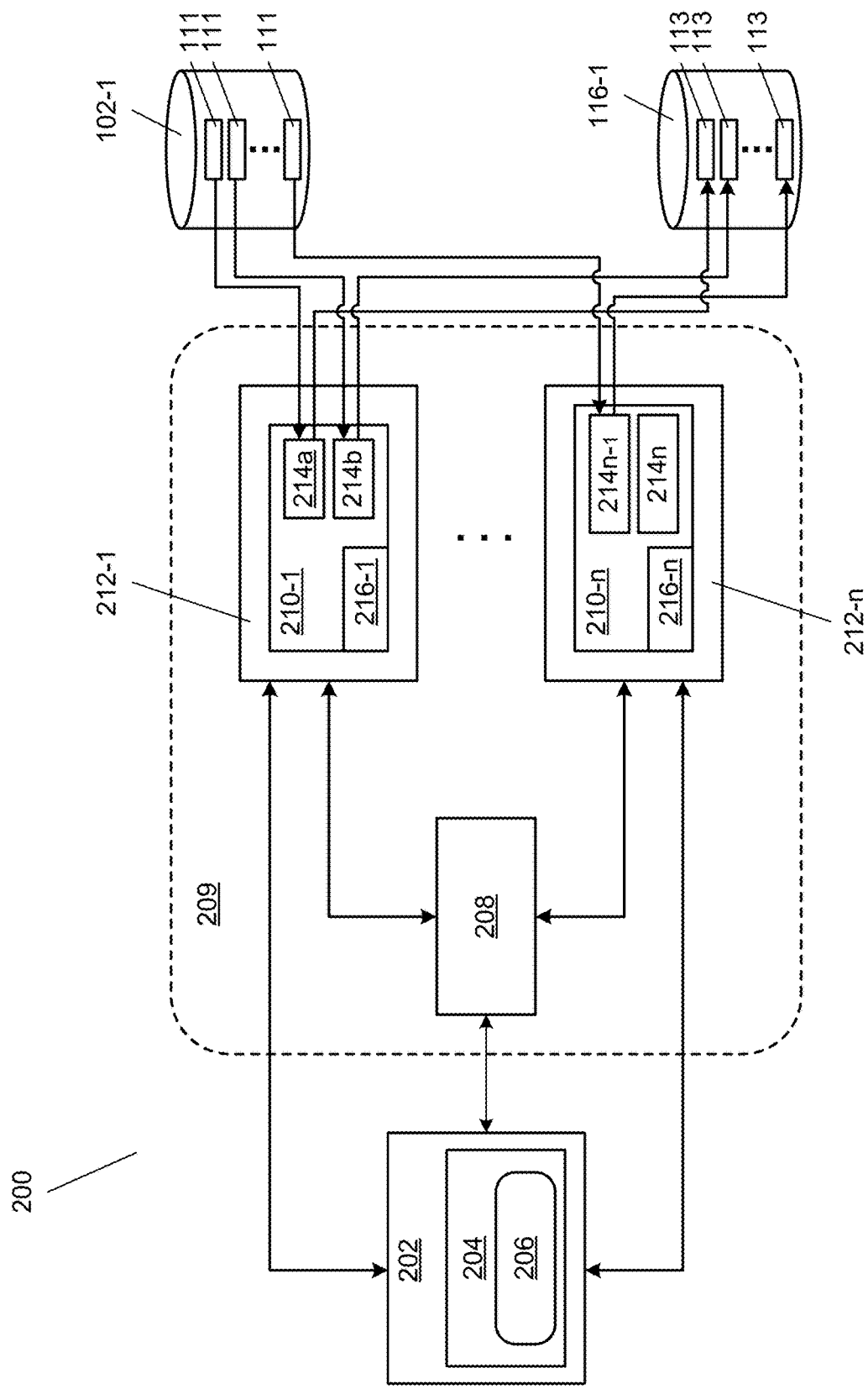
FIG. 2 illustrates, in simplified form, a simplified, high level architectural overview of a system in accordance with the teachings herein.

FIG. 2 illustrates, in simplified form, a simplified, high level architectural overview of a system 200 in accordance with the teachings herein. For simplicity and understanding, only one source 102-1 and target 116-1 are shown, however, it is to be understood that any number of sources and targets could be involved. As shown in FIG. 2, at a client node 202, is a driver 204 program or process which is responsible for coordinating the execution of the transfer application 104. The driver 204 runs the main function of the transfer application 104 and creates a Context 206. The Context 206 is the entry point for particular transfer application 104 functionality and represents a connection to a cluster 209. The Context 206 can be used to create, for example, Resilient Distributed Datasets (RDDs), accumulators, and broadcast variables. The Context 206 also coordinates the execution of tasks.

The client node 202 is connected to a master node cluster manager 208 for a given cluster 209. The cluster manager 208 is responsible for allocating resources and managing the cluster 209 on which the transfer application 104 runs. Representative software suitable for use as a cluster manager 208 include, for example, Apache Mesos, Hadoop YARN, Apache Kubernetes, or other cluster managers. The cluster manager 208 is coupled to one or more executors 210-1, . . . , 210-n. The cluster executors 210-1, . . . , 210-n are processes that are responsible for executing tasks in the transfer application 104. They are launched on worker nodes 212-1, . . . , 212-n and communicate with the driver program 204 and cluster manager 208. The executors 210-1, . . . , 210-n run tasks concurrently and store data in non-transitory or cache memory 216 or on disk for caching and intermediate storage.

A task is typically the smallest unit of work in the transfer application 104 and represents a unit of computation that can be performed on a single partition of data. The driver 204 program divides a job into multiple tasks 214a, 214b, 214c, 214d and assigns them to the executors 210-1, . . . , 210-n for execution.

More particularly, in operation, when the driver 204 executes, it calls the actual program of a source application 102-1, 102-2, 102-3, . . . , 102-n and creates a Context 206. The Context 206 contains all the basic functions required for the operation. The driver 204 includes several other components, for example, various schedulers such as a Directed Acyclic Graph (DAG) Scheduler, Task Scheduler, and a Backend Scheduler, along with a Block Manager. Those schedulers and the Block Manager are responsible for translating user-written code into jobs that are executed on the cluster 209. The driver 204 and Context 206 collectively watch over job execution within the cluster 209.

The cluster manager 208 manages the execution of various jobs in the cluster 209. The driver 204 works in conjunction with the cluster manager 208 to control the execution of various other jobs. The cluster manager 208 allocates resources for jobs. Once a job has been broken down into small tasks 214a, 214b, 214n-1, 214n, the tasks 214a, 214b, . . . , 214n-1, 214n (which can vary in number based upon the number of cores available and/or the number of partitions the data is read in) are distributed across cores present in the worker nodes 212-1, . . . , 212-n, with the driver 204 controlling their execution. Many worker nodes 212-1, . . . , 212-n can be used to process an RDD created in the Context 206, and the results can also be stored in the non-transitory or cache memory 216-1, . . . , 216-n of the worker nodes 212-1, . . . , 212-n.

A Context 206 receives task information from the cluster manager 208 and distributes it to the worker nodes 212-1, . . . , 212-n. The cluster executors 210-1, . . . , 210-n are in charge of carrying out execution of their assigned tasks 214a, 214b, . . . , 214n-1, 214n. Advantageously, the lifespan of any given cluster executors 210-1, . . . , 210-n can be the same as that of the transfer application 104. As a result, the number of worker nodes 212-1, . . . , 212-n can be increased to improve performance of the system by allowing a job to be divided into more coherent parts.

Alternatively, for smaller jobs, the number of worker nodes 212-1, . . . , 212-n can be minimized so as to not use resources that are not actually necessary and thereby also improve performance of the system.

Figure 3:
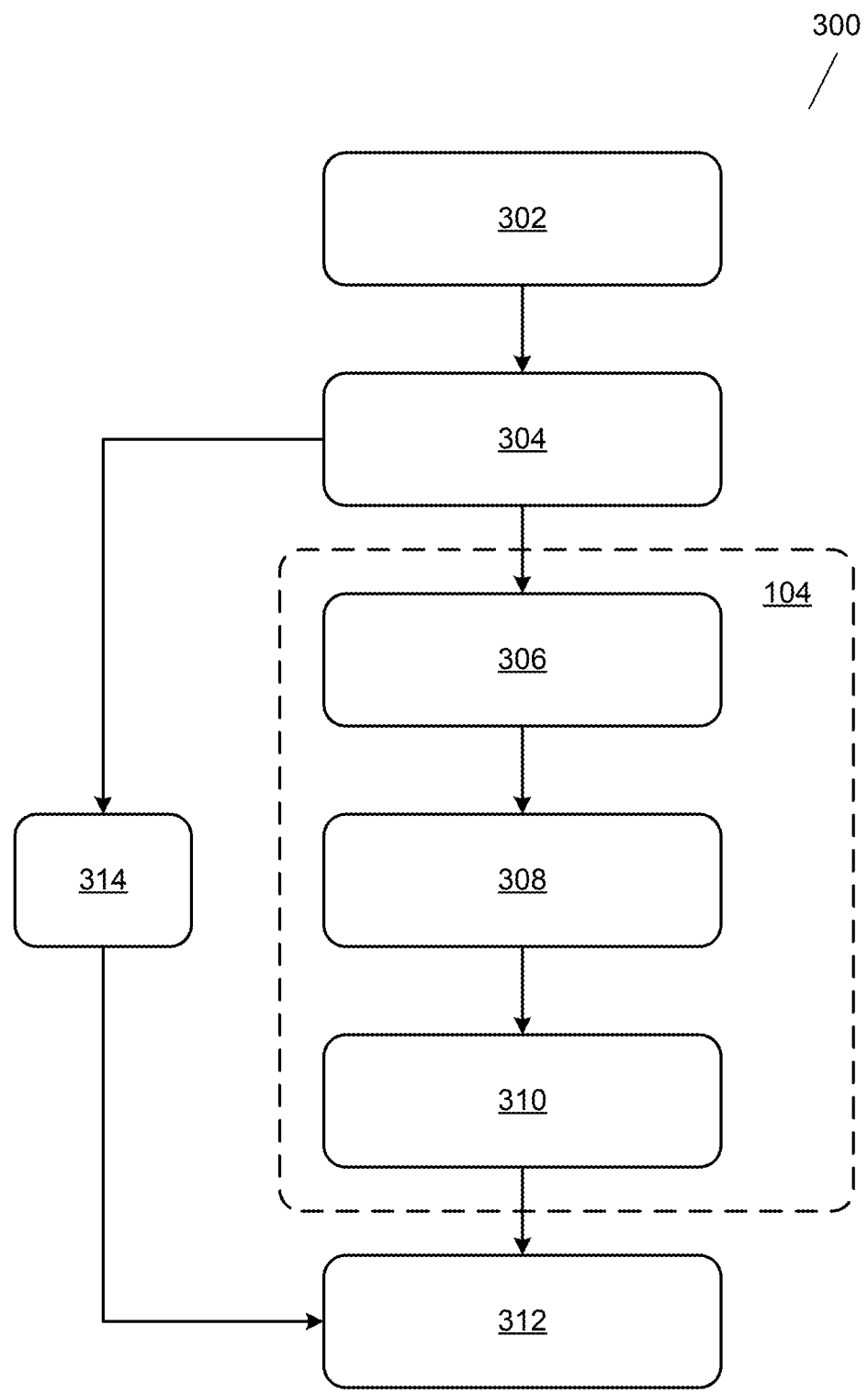
FIG. 3 illustrates, in simplified, overview, form another functional view of a framework incorporating the teachings herein.

FIG. 3 illustrates, in simplified, overview, form another functional view of a framework 400 incorporating the teachings herein.

As shown in FIG. 3, the framework 300 is made up of the metadata and configuration read functions 302, pre-processing functions 304, data read functions 306, data processing functions 308, data write functions 310, and post processing functions 312. In addition, our system and approach can also enable users to make use of vender specific utilities 314 for data transfer. For example, the approach can allow for integration with tools like the Greenplum Platform Extension Framework to support parallel access to segments, the Snowflake data platform's Put-Copy utility to assist in efficient loading of small datasets to Snowflake or its GET utility to move internal data to a client computer.

Figure 4:
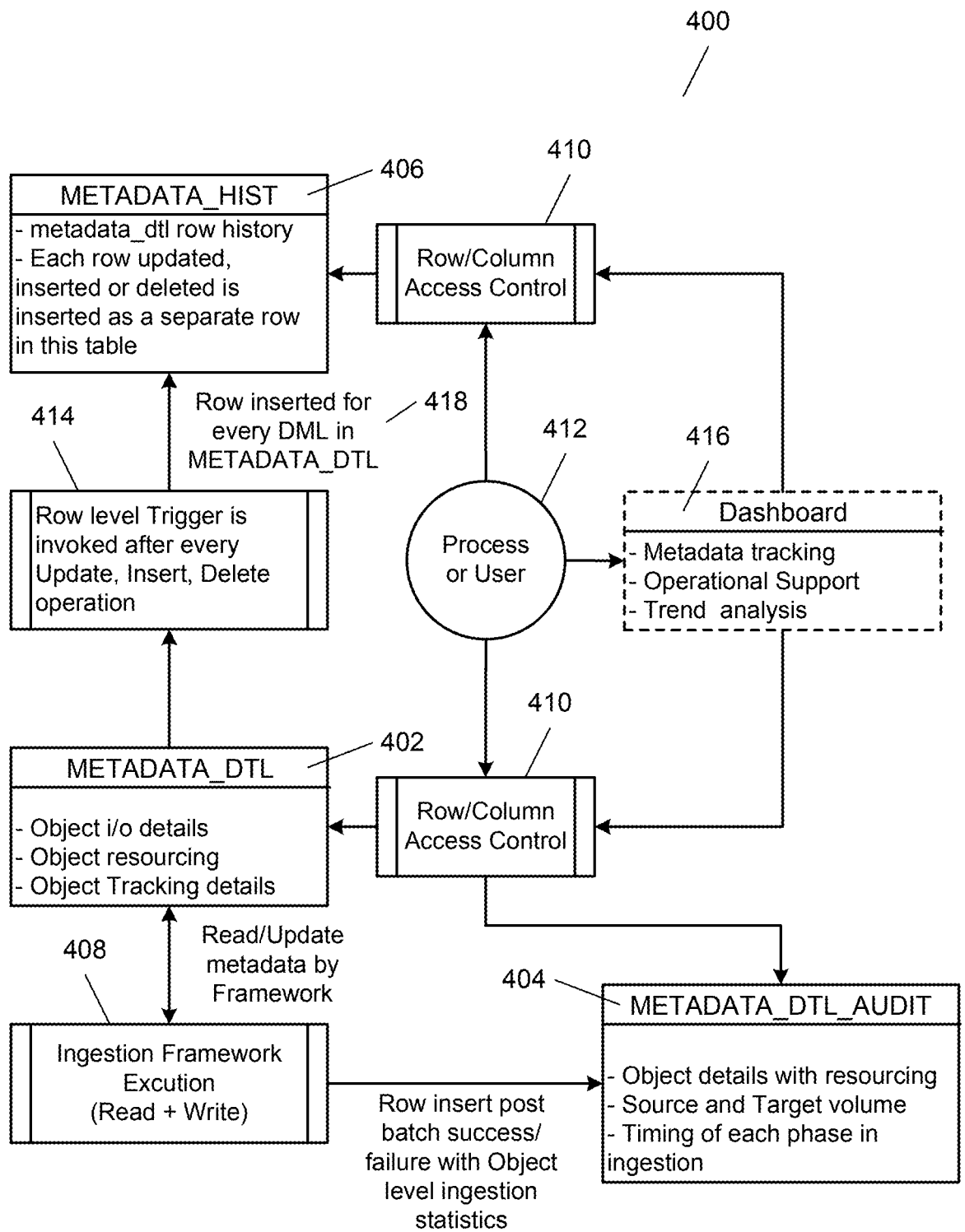
FIG. 4 illustrates, in simplified, overview, form a design for the metadata and configuration read functions of the Framework.

FIG. 4 illustrates, in simplified, overview, form a design for the metadata read function 302 of the framework 300.

With continuing reference to FIGS. 3-4, the framework 300 makes use of conceptually three metadata tables that hold object level information, although, in different implementation variants, the same information could be contained in a single table, or any number of separate tables, the important aspect being the information contained and tracked, not its arrangement.

The use of metadata advantageously enables object level batch processing and tracking, the auditing of each ingestion process with details of the time and data volume, performance of trend analysis, as well as the capability to provide row level access control, and, optionally, "dashboard" 416 setup capability via, for example, a visualization tool.

The three conceptual tables used for the metadata read functions 302 are a Metadata Detail Table 402, a Metadata Audit Table 404 and a Metadata History Table 406. Optionally, a dashboard can be created to reside "on top of" these metadata tables 402, 404, 406 to enable a support team to easily identify trends and track failures, which can be valuable for use in proactive system monitoring, maintenance, and troubleshooting.

The Metadata Detail Table 402 is the main table which drives the framework and makes it a generic solution. The Framework 300 queries this table and gets the input and output details necessary to perform batch ingestion at the object level. The Metadata Detail Table 402 also keeps track of commit point and batch intervals at the object level. A query is executed on top of this metadata to get each object's detail and the values contained therein are used in execution of the framework 300.

The major columns of the Metadata Detail Table 402 may include, for example:

Role name: which specifies grouping of object to be considered in batch processing. For example, if fifty tables are to be migrated from one source to a particular target, they can all be grouped under one role name. The Framework 300 command uses this role name to identify objects for data loading.

Input and Output object and schema details.

Source/Target filtration condition(s).

A Batch commit point at each object level. The column values may be, for example, in timestamp, date or integer format.

The Batch Interval for each table.

A Column list (if specific columns to be read and loaded).

A run counter for specifying the sequence of data load for tables.

Source parallelism, target parallelism and "split by column" name data. This is used for the transfer application 104 to perform parallel read using "split by column" and to write to the target using a repartition feature.

The transfer application's configuration holding executor, core and the memory required at object level from a cluster.

A project and/or application name: which can apply row level access based on a specified project and/or the application name specified. In this way, the row & column access controls can make sure that a requester can only view and control their own metadata rows and not hamper other application's rows in same metadata.

A hierarchy for grouping objects, roles and applications such that users can have any number of projects, applications, roles and objects as desired/required, e.g.:

PROJECT_NAME (Project level)
    APP_NAME (Application level—multiple applications can be grouped under a single project)
        TABLE_NAME (Object level—multiple objects can be ingested under one role)

The Metadata Audit Table 404 holds auditing information for the batch processing at the object level. Audit information included in this table includes source/target level information along with volume and time of batch processing. Advantageously, the contents of this table can be useful in performing trend analysis, tracking history, and getting performance statistics.

The major columns of the Metadata Audit Table 404 may include, for example:

Each column of the Metadata Detail Table 402.

Batch start and end point details, which are typically derived from commit point and batch interval.

Batch execution start and end time details.

Target count prior and delete data flag, which shows the target object count before batch ingestion and if deletion was performed.

Stamping of read to write time, typically recorded in seconds, count time on the source and target, and data deletion time (typically in seconds) if the target already had data.

Source and Target count after batch ingestion.

The Metadata History Table 406 holds the before and after state of rows updated in the Metadata Detail table 402. The Metadata History Table 406 has data inserted 418 for each update/insert/delete operation that occurs in the Metadata Detail Table 402 via triggers. Since the Metadata Detail Table 402 plays a critical role in batch ingestion, any wrong update in a commit point, a batch interval, or a configuration column may cause breaks in Ingestion processing. Advantageously, due to the presence of the Metadata History Table 406, it is possible to trace back to find out when, and what caused, the erroneous metadata update because each update/insert/delete operation is logged in the Metadata History Table 406.

Advantageously, using the Metadata History Table 406, it is possible to bring back the Metadata Detail Table 402 to a prior status if it was updated improperly. For example, if a user wanted to change the configuration of one table but accidentally updated all one hundred tables mentioned in the Metadata Detail Table 402, it will be possible to correct the configuration for the other ninety-nine tables to their prior proper configurations.

The major columns of metadata table may include, for example:

Each column of the Metadata Detail Table 402.

Update time when any row was updated in the Metadata Detail Table 402.

Update User: The ID of the user or process that executed the update/insert/delete command the Metadata Detail Table 402.

The type of statement executed in the Metadata Detail Table 402. If the update happened in the Metadata Detail Table 402, then the Metadata History Table 406 will have a row inserted 418 with this column with a specified value, for example a "U" for "Updated," an "I" for "Insert" or a "D" for a deletion of a row in the Metadata Detail Table 402.

The Framework 300 provides the flexibility to have a single Metadata Detail Table which can be used by multiple applications or teams using the Framework 300.

Still further, to provide more control at the application level, implementation variants can enable row & column access control (RCAC) 410 to make sure that programs, processes or users can only view and access data of their own application, with other rows being hidden to that program, process or user(s).

Returning to FIG. 3, the pre-processing functions 304 and post-processing functions 312 are very similar, so they will both be discussed together. However, an important difference between them, and advantageous advance with our approach, is that the pre-processing functions 404 includes an analysis of the resource requirements for the specific migration to be performed by the transfer application 104. More particularly, as part of the pre-processing functions 304, an analysis/computation is automatically performed to ascertain the specific level of resources needed, in terms of time and utilization, for the data transfer.

As an ETL tool, the Framework 300 provides the ability to perform pre- and post-processing in addition to the ingestion of data to be transferred to the target.

Processes can be configured at either a particular object level or for all objects or at the batch level.

Processes that are configured at the batch level will be executed once before (Pre-process) and/or after (Post-process) the ingestion of the whole batch.

Depending upon the particular implementation variant, these processes will be specified in a configuration file, for example, under a "batch" subsection of the pre_process and/or post_process section.

Processes that are configured for specific objects are executed before (Pre-process) and/or after (Post-process) the ingestion of that object.

Depending upon the particular implementation variant, these processes can be specified in the configuration file, for example, under a subsection identified by the "<object_name>" of the pre_check and/or post_check section.

Processes that are configured for all objects are executed before (Pre-process) and/or after (Post-process) the ingestion of every object that is being ingested.

Depending upon the particular implementation variant, these processes can be specified in the configuration file, for example, under an "all_objects" subsection of the pre_check and/or post_check section.

A representative example of the format in which checks and actions can be specified in a configuration file is as follows followed by a parenthetical indicating the details of what may be included. Note that all values that are read from the configuration file, including the script execution command, are processed to replace any placeholders mentioned with the corresponding values that the framework computes or retrieves from the metadata. Through this, the script can accept parameters that are computed for a particular execution.

```
pre_process/post-process: (Tells whether the section corresponds to a pre-process or post-
process);
    batch/all_objects/<object_name>: (Tells whether the process needs to be applied once for
    the batch/for every object/for a specific object name);
        script: "" (Specifies the command that should be executed (e.g., on the Linux
            CLI));
pre_process/post-process: (Tells whether the section corresponds to a pre-process or post-
process);
    batch/all_objects/<object_name>: (Tells whether the process needs to be applied once for
    the batch/for every object/for a specific object name);
        query_check _< n>: (Specifies that the section corresponds to a SQL check, and a
        number that corresponds to the order of execution of checks)
            platform_type: " (Specifies where SQL should be executed, i.e., one of
            "source", "target", "metadata")
            query: "" (Specifies the SQL query itself that needs to be executed. The
            output should be one of "Wait", "Success", "Failure", "Proceed")
            action _< n>: "" (Specifies the SQL that should be executed in case the
            output of the check query is "Proceed" and a number that corresponds to
            the order of execution of actions. This is usually an update or a call
            statement.);
            check_wait_time: (Specifies the time [typically in seconds] for which the
            process should wait in case the output of the check query is "Wait")
```

A representative example of a configuration file in accordance with the above is as follows:

```
pre_process:
    batch:
        script: "<execution_command>"
post_process:
    all_objects:
        query_check_1:
            platform_type: "source"
            query: "SQL query"
            action_1: "SQL update/call statement"
            check_wait_time: 5
        query_check_2:
            platform_type: "target"
            query: "SQL query"
            action_1: "SQL update/call statement"
            action_2: "SQL update/call statement"
            check_wait_time: 5
```

Multiple checks can be configured to run for each object/all objects/batch and each check may have multiple actions corresponding to it.

Processes are executed sequentially in the order mentioned in the configuration file.

Each action under a corresponding check is performed sequentially given the output of the corresponding check is 'proceed'

Pre-/post-processing will be performed, depending upon the particular implementation variant, by any or a combination of a script, a check & action pair. Depending upon the particular implementation variant, the script can be, for example, a python script, a shell script or a java script that will be executed on the host machine. A Check & Action pair and/or the query to overwrite a parameter can, depending upon the particular implementation variant, be executed at the Metadata or Source or Target server(s).

Depending upon the particular implementation variant, where scripts are used, they are executed by the Framework 300 at either the batch level or object level. The output of a script will typically be either one of the following:
  a) Success: In the case where the output of the script is a success, the pre/post process will be marked with "Success" or a selected success indicator and the Framework 300 will proceed to execute the next set of pre/post processes.
  b) Failure: In the case where the output of the script is a failure, the Framework 300 will exit with an indicator of a failure status at that point.

Depending upon the particular implementation variant, where Checks & Actions are used, pre/post checks typically include case statements that, depending upon the particular implementation variant, output one of the following values when executed against the Metadata/Source/Target server(s) as specified:
  a) Wait—For 'wait' as an output, the process will wait for a configured check_wait_time value (specified in the configuration), before performing a check again.
  b) Success—For 'success' as an output, the process will exit and a script will exit with a return code value, for example, a '0' indicating successful execution of the script.
  c) Failure—For 'failure' as an output, the process will exit and a script will exit with a return code value, for example, a '1', indicating failure during execution of the script.
  d) Proceed—For 'proceed' as an output, the process will check for any corresponding action(s) and perform if exists. If there is no action configured for a check, it proceeds with the next check if any.

Actions are typically update/call statements that are executed when the corresponding check returns 'proceed' as an output. Actions queries are parsed to ensure that no destructive actions like delete/drop are performed.

Figure 5:
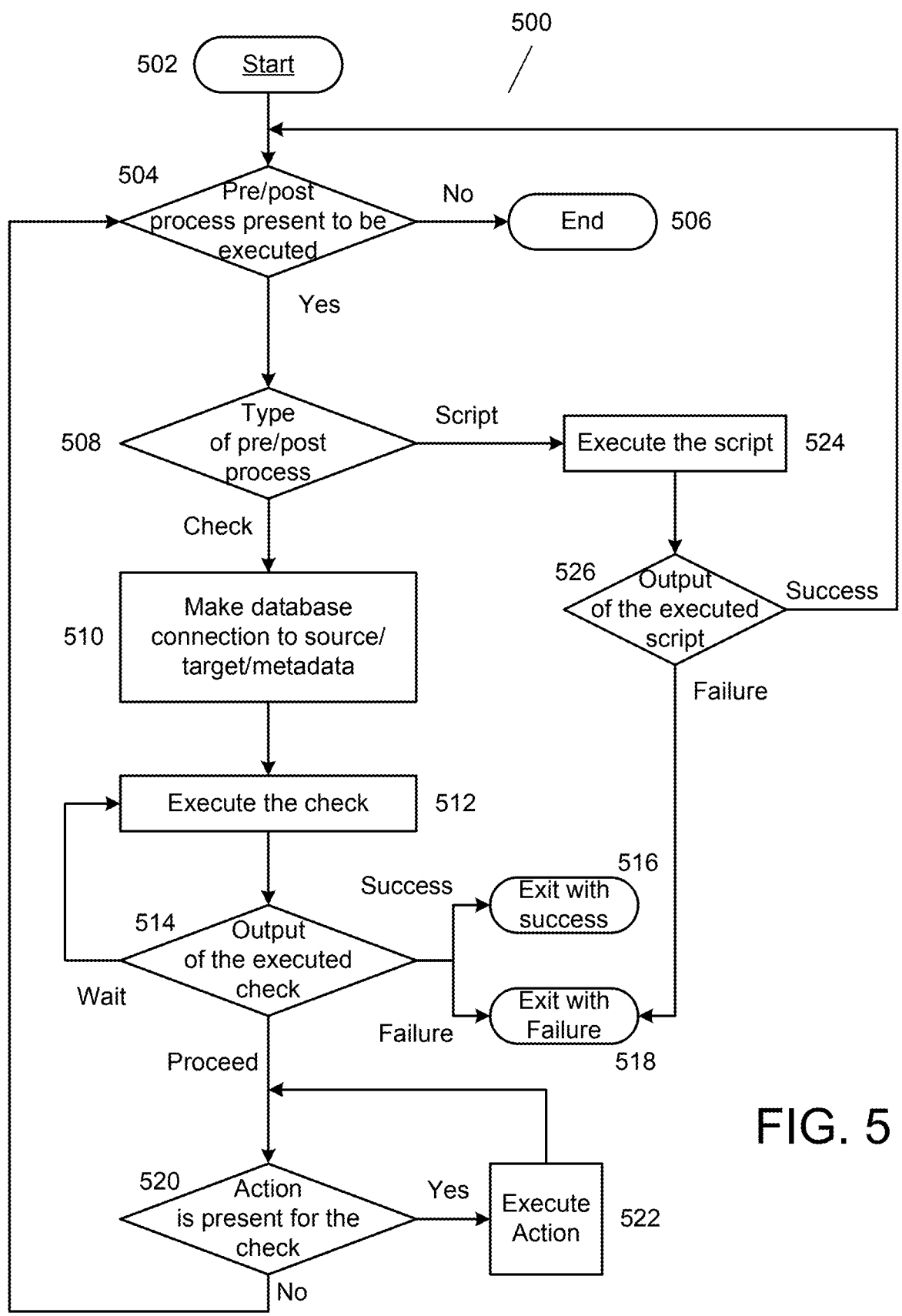
FIG. 5 is a simplified flowchart for a representative example of pre- and/or post-process execution in accordance with the teachings herein.

FIG. 5 is a simplified flowchart 500 for a representative example of pre- and/or post-process execution in accordance with the teachings herein.

The process begins (Step 502) and the Framework 300 determines whether a pre- or post-process is present to be executed (Step 504) and if the output is none, the flow terminates (Step 506).

If there is, the Framework 300 determines the type of pre- or post-process it is (Step 508). If the process is a "check" process, then the Framework 300 makes a connection to the particular database server specified in the configuration (Step 510) and executes the check (Step 512). If the output of the executed check (Step 514) is "Wait" the process waits for the time specified in the configuration and then re-executes the check (Step 512). If the output of the executed check (Step 514) is "Success" the process exits with a "Success" indication (Step 516). If the output of the executed check (Step 514) is "Failure" the process exits with a "Failure" indication. If the output of the executed check (Step 514) is "Proceed" the process determines if there is an Action present for the check (Step 520), if so, the Action is executed (Step 522) and, if not, the process returns to determining whether a pre- or post-process is present to be executed (Step 504).

Figure 6:
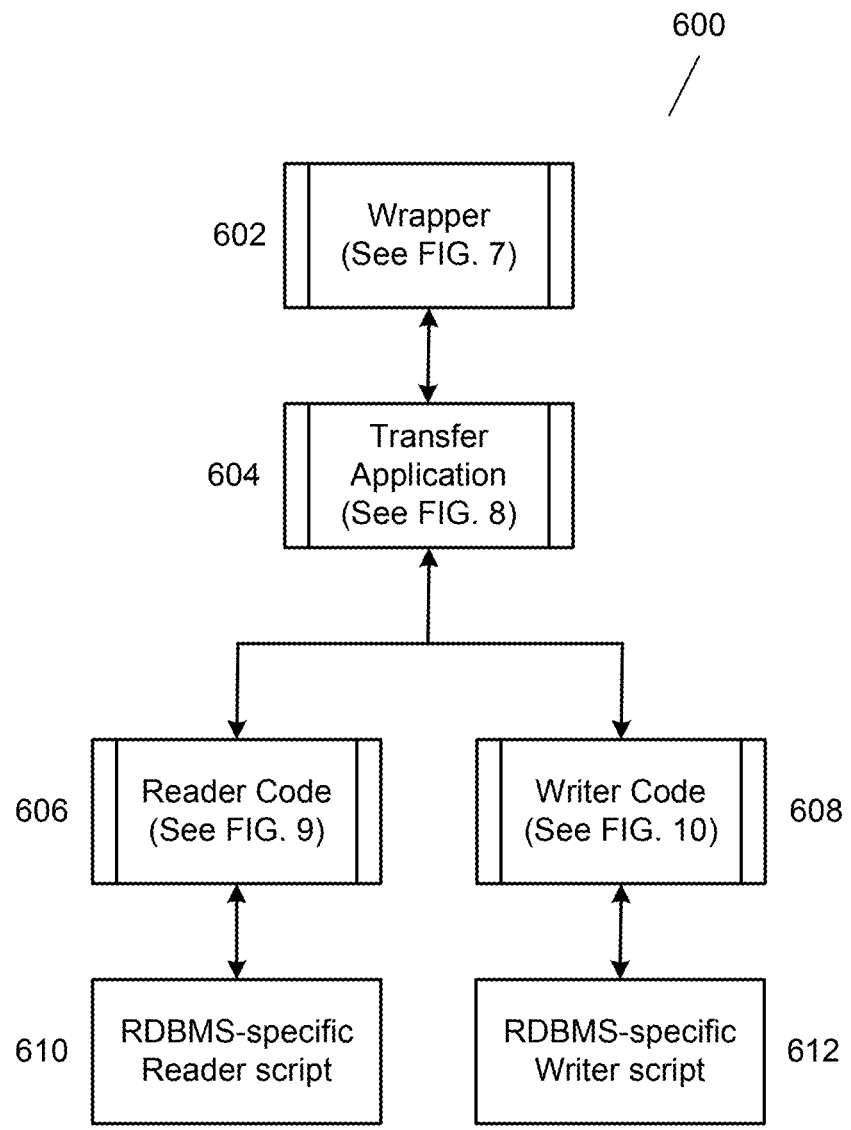
FIG. 6 illustrates, in simplified form, an overview of the organization of the call statement hierarchy involved in the actual RDBMS to RDBMS transfer process.

FIG. 6 illustrates, in simplified form, an overview 600 of the organization of the call statement hierarchy for modular functions involved in the actual RDBMS to RDBMS transfer process.

As shown, a code wrapper 602 calls the transfer application 604 (Ref. 104 of FIG. 1) which, in turn, calls the reader code module 606 and the writer code module 608. The reader code module 606 is responsible for executing the script 610 needed to read from the particular source RDBMS. The writer code module 608 is responsible for executing the script 612 needed to write to the particular target RDBMS.

Figure 7:
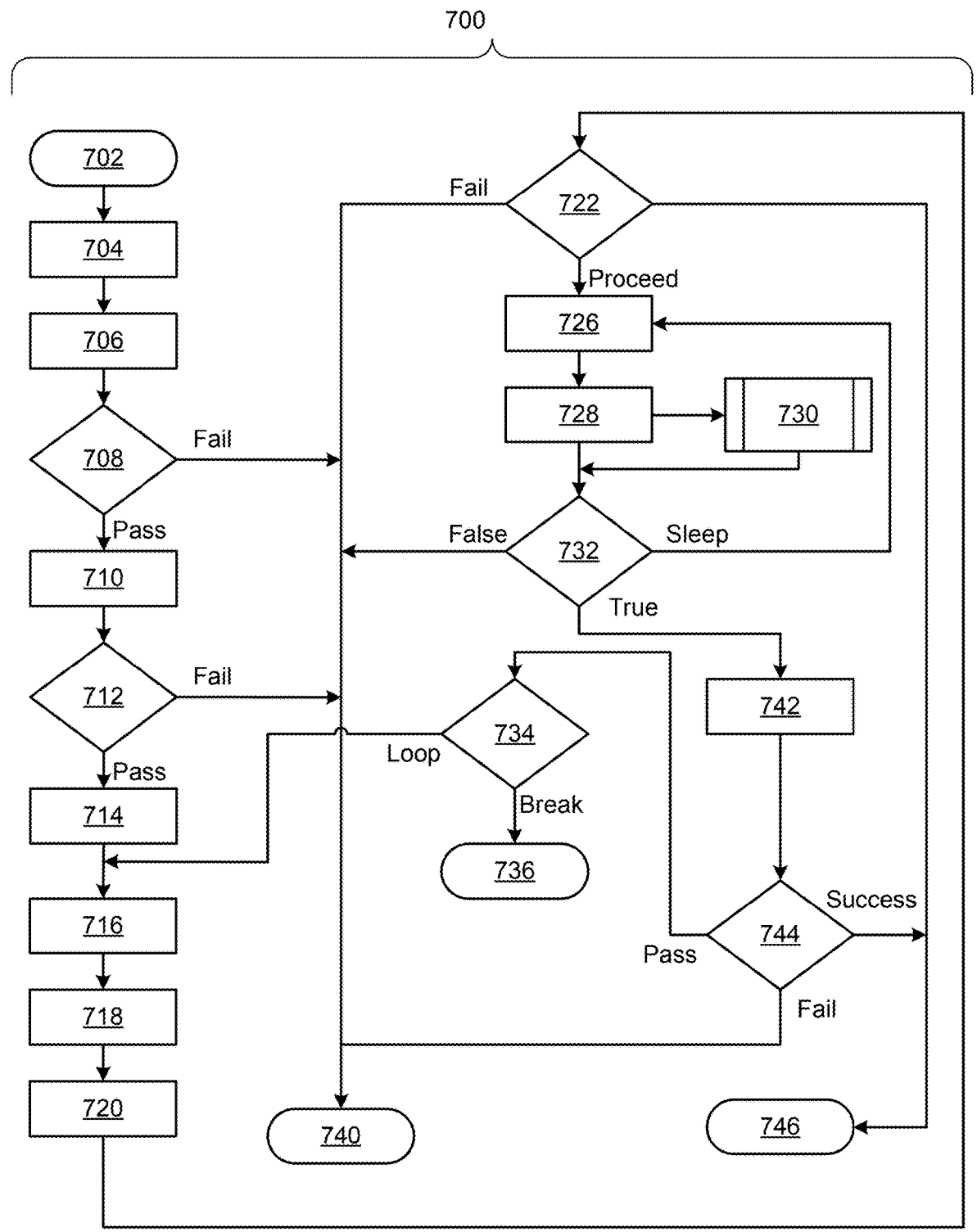
FIG. 7 is a simplified flowchart for a representative example wrapper for the code encompassing the Data Read Functions and the Data Write Functions.

FIG. 7 is a simplified flowchart for a representative example wrapper 700 encompassing the Data Read Functions and the Data Write Functions.

At this point it should be noted that while the Data Read Functions and the Data Write Functions are encompassed by the wrapper 700, this is not a requirement for all implementations. Depending upon the particular implementation, the Data Read Functions and the Data Write Functions could each be discrete and need not have any overall wrapper so long as the necessary aspects provided by the wrapper are incorporated elsewhere. Alternatively, the Data Read Functions and the Data Write Functions could be crafted as a unitary function, with, for example, settings determining if the particular execution is for reading or writing so that the appropriate RDBMS reader or writer can, in turn, be called.

The wrapper process is initiated and the wrapper code begins execution (Step 702). The a logger module is initialized to perform formatted logging (Step 704). Next, the relevant arguments are read (Step 706) and a check is performed on the mandatory parameters (Step 708). If the parameter check fails, the process terminates (Step 740). If the parameter check passes, the process proceeds and a configuration file is read (Step 710) and the configuration is validated (Step 712). If the configuration validation fails, the process terminates (Step 740). If the configuration validation passes, the process proceeds and a "while" loop is triggered (Step 714). The "while" loop encompasses Step 716 through Step 734.

The "while" loop begins with a connection being established to the Metadata Detail table 110, 402 that is to be processed (Step 716) and a query is executed to gather metadata information corresponding to the specific batch (Step 718), e.g., start_point, end_point, and other object level details such as run_status, configuration, etc. In general, tables having an "F" status are processed first, followed by tables having a "Y" status.

The pre-processes 304 (Step 720), configured at both the batch level and object level, are then executed in the manner described above in connection with FIG. 5.

Following the execution of the pre-processing module, the output of the pre-processing module will be checked (Step 722) and may have one of the four possible outputs: "Wait," "Fail," "Success" or "Proceed."

One example of a pre-process at the batch level may be a validation to check (Step 722) to determine if any table with an "R" status is present and if any such table exists, the process would terminate (Step 740). Another example could be the resource calculation process as will be described below.

Returning to Step 722:
If the output is "Wait" then a specified time period (for example, 30 seconds, 1 minute, 1 hour, etc.) is waited before rerunning the check. (Note here that, depending upon the specific implementation, this could be a time based trigger check or an upstream check for the ingestion process),
If the output is "Fail," (for example, because a certain condition was not met) the process terminates (Step 740),
If the output is "Success," the check has passed (for example, because the certain condition was met) and the process proceeds to Step 746, or
If the output is "Proceed," then the check ahs passed and execution of the remaining script proceeds (Step 726).

On completion of the pre-process (Step 722), next, the metadata list is passed (Step 726) to a multiprocessing module. The multiprocessing module starts by creating a process pool with a queue width as specified (or using a default value) and issuing a map process (Step 728) for all objects in the queue of objects. For each object, the required runtime parameters are then gathered and a submit command is formed and executed (Step 730) using a subprocess module (Steps 604, 104), for example and as shown, written in Python (although the use of Python is not required, any other suitable programming language can be used).

The multiprocessing module returns a return_flag for each object in the ingestion batch and the return_flag is then checked (Step 732). The possible values for the return_flag are "False," "Sleep" or "True." If the return_flag value is "False," the process crosschecks the metadata to identify which table(s) failed and (optionally) provides an output to that effect, for example, in tabular, graphical or other form and the process terminates (Step 740). If the return_flag value is "True" (meaning the transfer of data corresponding to all objects in the batch is successful) the process continues to check the RUN_ONCE flag (Step 734). If the return_flag value is "Sleep", then the process sleeps for a specified period of time, for example, 1 or 2 minutes, etc., and then returns to Step 726 to re-run.

Next, the post-process 312, configured at both the batch level and object level are then executed (Step 742) as described in connection with FIG. 5.

The output on execution of the post-processing module is then checked (Step 744) and can have one of the four possible outputs:
"Wait," which causes it to wait a specified time period (for example, 30 seconds, 1 minute, etc.) before running the check again. As above, depending upon the specific implementation, this could be a time based trigger check or a downstream check),
"Fail," which causes the process to terminate (Step 740) because the check failed,
"Success" which means the process has successfully completed (Step 746), or
"Proceed" which causes execution of the remaining script because the check passed.

If the result is "Proceed," a RUN_ONCE flag is then checked (Step 734)—if the RUN_ONCE flag is not set, the process sets the RUN_ONCE flag and loops back (Step 716). The setting of the RUN_ONCE flag makes sure the process only loops once and then breaks out of the loop. If the check (Step 734) indicates that the RUN_ONCE flag is set, the process completes (Step 736).

Figure 8:
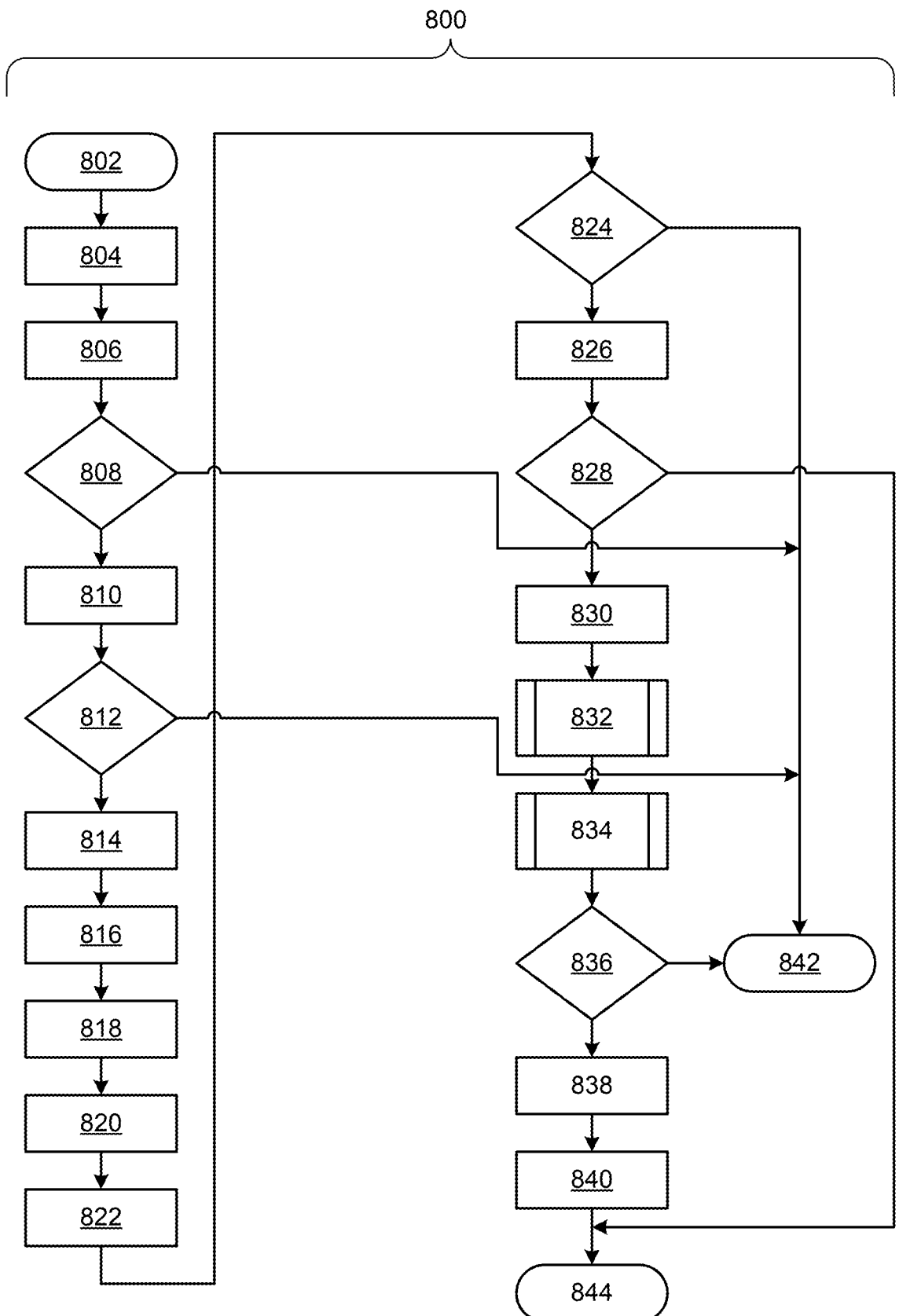
FIG. 8 illustrates, in simplified form, a representative example flowchart for executor operation in accordance with the teachings herein.

FIG. 8 illustrates, in simplified form, a representative example flowchart 800 for operation of the transfer application 104 in accordance with the teachings herein.

The process begins with the triggering of the transfer application 104 to start execution (Step 802).

A logger module is then initialized to perform formatted logging (Step 804).

Next, command line arguments are read (Step 806), and validation(s) are performed on them (Step 808). If the command line arguments do not pass the validation, the process is terminated (Step 842). If the command line arguments pass, the process proceeds.

Next, the configuration information 108 is read (Step 810) and validation(s) are performed on it (Step 812). If the configuration information does not pass the validation, the process is terminated (Step 842). If the configuration information passes, the process proceeds.

Connectivity is then established with the metadata server 110 (Step 814) and metadata for the particular object that is to be migrated is sourced (Step 816).

The process will then begin to run, so the run status in the metadata for that particular object is updated to reflect a "run" status (Step 818).

At this point, batch execution for the migration starts with the creation of a session (Step 820) based on the specification(s) set in the configuration information. Depending upon the particular implementation, the configuration information can include, for example, transfer application 104 version, cluster manager 208 to be used, transfer application 104 mode to be used, session variables, cluster specifications, etc.

Next, credentials are gathered from a secure credentials vault (Step 822) to make sure that the requestor of the migration (which, depending upon the particular implementation, may be a user or an invoking program or process) is authorized to invoke the migration. Authorization (Step 824) is performed for the requestor (Step 824). If the authorization (Step 824) fails, the process is terminated (Step 842). If the authorization passes, the process continues, Next, the source count, representing the number of records in the source object, and target count, representing the number of records in the target object, are retrieved (Step 826).

If the Source Count is zero, the metadata is updated (Step 828) and the migration process is marked completed as no data to write from the source (Step 844).

Optionally, if a flag is set (for example, an eliminate duplicate batch flag), then if the target count is greater than zero then the data from the target is deleted for the batch (Step 830). Otherwise, the batch is marked to failure with metadata updated and the process is terminated (Step 842).

Then, the reader module 606 is invoked by the transfer application 104 to retrieve the source dataframe (Step 832) and the writer module 608 is called by the transfer application 104 to write the source dataframe into the target (Step 834).

In addition, a row count validation (Step 836) is performed between the source and the target. If the counts do not match, the process terminates (Step 842) and updates the metadata to FAILURE. If the counts match, then the process proceeds and updates the metadata to SUCCESS (Step 840). In the event of an unexpected failure before or during the count calculations, retry logic is activated Step 838).

When the migration is complete, the process successfully terminates (Step 844).

The data read operations will now be discussed, followed by the data write operations.

The Data Read Functions 306 are triggered in Step 832 of FIG. 8.

Figure 9:
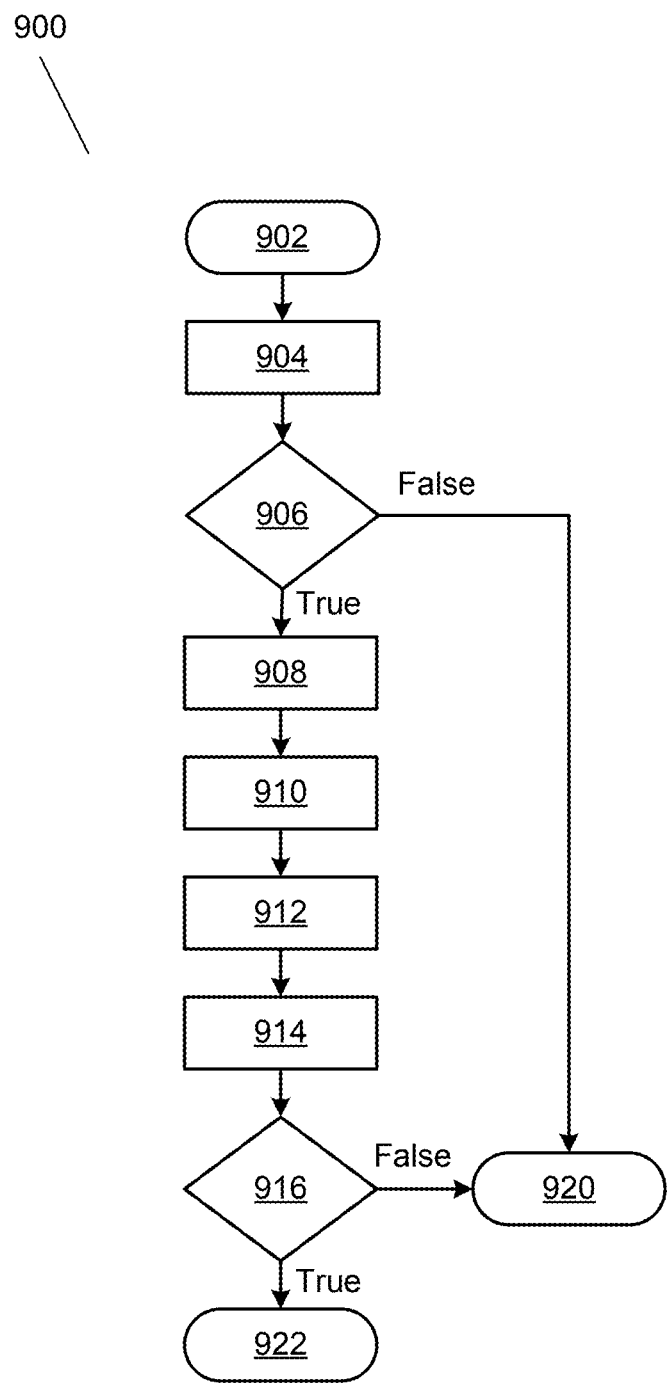
FIG. 9 is a simplified flowchart for a representative example of the Data Read Functions for reading from a source RDBMS.

FIG. 9 is a simplified flowchart 900 for a representative example of the Data Read Functions 306 for reading from a source RDBMS. For simplicity, the process with reference to an example implementation involving Apache Spark.

The process 900 begins with the triggering of the Spark reader module to which is passed two arguments, read method and source type (Step 902). The read method indicates information such as the type of connector to be used to read the source database, the configuration to use, etc. The source type specifies the type of source database, for example, Snowflake, DB2, Greenplum, etc.

Next, in Step 904, the get_coulmn_list method is called and the source and target are queried to get the list of columns and their datatypes. Note here that, although this example is described in the context of Spark, datatypes that are not supported by Spark would also be handled.

Then, the schemas of source and target are compared (Step 906) using one or more checks. For example, If the target is missing columns present in the source and no transformation is provided for the column, the process will fail (Step 920). If the source columns are not in the target, depending upon the config parameter, the process will fail (Step 920). Likewise, extra columns in the target can be made "null" based upon a config parameter value. Extra columns in the target may also be ignored (for example, if the column is pre-populated with default values in the target) based upon the config parameter value.

Column mapping between source and target is retrieved to create required aliases for the reads (Step 908). Then column transformation is performed to get the final column list (Step 910). Note here that transformations can be datatype based, name based or value based, depending upon the particular implementation.

A specific Spark Reader method is then called (Step 912) based upon the source type and read method with the column list from Step 910 being provided as the input.

Finally, the Spark Reader APIs perform the read (Step 914).

In Step 814, the flow is as follows. The Logger is initialed. A check is then performed to see if the particular DB is the source or target and to interpret input parameters such as schema_name, table_name accordingly. Then a query is generated. If a Source Custom query is provided then that would be used instead of column_list and where_clause. The Table_query and where_clause are modified based on target_extra_where_clause, replacing placeholders like start_time and end_time for the batch process. Reader partitions are accessed to determine the number of parallel reads to perform. A row_number calculation is performed when the partition_column column is not specified (for example, the partition column becomes row_number for a DB2 database). A lower, upper bound is calculated based on partition_column column for a given batch (partition_column column can be either a date, datetime or an integer column). Data is then read from the source as dataframes (for example, JDBC Reader suppresses logical partitions with zero data).

The output is then checked (Step 916). If the output is "False" the process terminates (Step 920) or, if the output is a dataframe read, the process is successful (Step 922).

Figure 10:
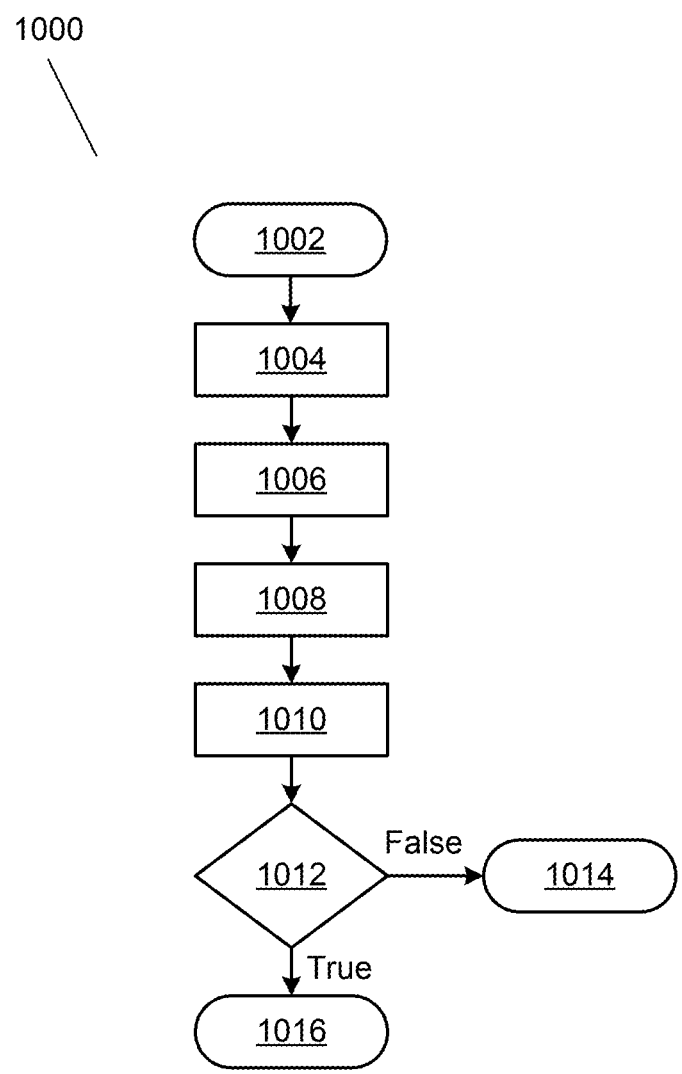
FIG. 10 is a simplified flowchart for a representative example of the Data Write Functions for writing to a target.

FIG. 10 is a simplified flowchart 1000 for a representative example of the Data Write Functions 310 for writing to a target, continuing using the example Apache Spark-related implementation.

In general overview of the process flow for this example involving Spark, the Spark writer module is activated by initializing a constructor with two arguments: the source dataframe and an object parameters dictionary. The source dataframe contains the dataset queried from the source platform, while the object parameters dictionary holds key-value pairs specific to the object level. A Logger is initialed. For the DB Connectivity above, connection parameters are obtained from the config (JDBC url, driver, fetch_size etc.), if appropriate, a credentials vault is connected to in order to retrieve sensitive data such as authentication keys. Host and port details are looked up if only logical names for a server is provided. A writer options dictionary is generated merging keys extracted from the constants and config, with config values having higher precedence. The dataframe is repartitioned if reader_partitions is not equal to writer partitions and the dataframe is written to the target based upon mode (e.g., append/overwrite) and options such as database/target schema, collection/target table, batch_size, etc.). In the case of, for example, Apache Hive, the catalogue table is also refreshed.

More particularly, the process 1000 begins with the triggering of the Spark writer module (Step 1002) by initializing the constructor and passing two arguments, source dataframe and object parameters dictionary (Step 1004). Then, the Spark_write_data method gets called and determines the appropriate target-write method to use based on the parameters specified in the configuration file. The specific "write_method" is identified by reading config file "spark_target_write_method" value and, based on config value passed, particular target writer method is called (Step 1006).

The framework includes plugins for various on-premises and cloud platforms, for example, if the target is the Snowflake cloud data platform, the Snowflake writer method would be called.

The target connectivity details (e.g., passphrase, private_key, DB, schema, warehouse, proxy, query_tag etc.) are prepared (Step 1008) and the repartition value is checked and, if set, then the Spark dataframe can be re-partitioned based upon source and target parallelism values.

By way of example, for connecting to the Snowflake cloud data platform, several mandatory parameters must be gathered or calculated:

The Snowflake passphrase (for key-pair authentication);
The Snowflake private_key (for key-pair authentication),
The specific Snowflake database and schema to connect to,
The Snowflake warehouse to be used for data writing, and
The Proxy host information to securely transfer data from, for example, on-premises to cloud.

Next, the Spark writer API is called (Step 1010) with the Spark file options, batch_size and write mode may be appended or overwritten.

Continuing with the Snowflake as target example, the framework establishes a connection to Snowflake using the Spark writer API along with the options provided above and performs the data write operation. Of course, for other RDBMS targets, additional details like the server connection URL and driver may be required. Optionally, for some implementations, the framework might also take in other writer API parameters and options to improve efficiency while writing.

In addition, depending on the target parallelism value in the metadata, the writer can repartition the source dataframe to either increase or decrease the number of threads to improve write efficiency.

Returning to the Snowflake example, and using the Spark example implementation, the Spark Snowflake writer API offers various settings such as data write mode (append/overwrite) and batch size. This connector also ensures atomic transactions, meaning it either completes a full data load or terminates, thus avoiding partial loads.

Upon receipt of a response (e.g., "True" or "False") reflecting the batch writer API (Step 1010) output, the process checks the response (Step 1012). If "False" the process terminates (Step 1014) and if "True" the ingestion was successful (Step 1016).

This structured approach ensures that data writing is both efficient and reliable, minimizing the impact on the target platform while adhering to specified data handling policies.

In some cases, application users can face challenges when attempting to load bulk datasets into target platforms due to predefined thresholds designed to prevent cluster overload and minimize the impact on the performance of other critical applications utilizing the same platform. Advantageously, to address this issue, with our approach, an algorithm can be used to segment the large dataframes into multiple smaller dataframes and then copies the data in chunks.

This process would involve a pre-processing step where the data size per row would be calculated along with the total row count. During the data writing phase, the algorithm would check the size of the source dataframe (for example, in gigabytes) and compare it to the "write_threshold" parameter specified in the configuration file. By way of example, if the threshold is set at 250 GB and the total data size is 2 TB, the algorithm can (in the case of Spark) use Spark's "randomSplit" parameter with a split weight calculated as the total data size divided by the threshold (in this example 2 TB/250 GB=8). Consequently, the writer module would execute the data load in eight parallel chunks, effectively mitigating any impact on the target server or triggering timeouts. Through use of this approach, compliance with platform limitations can be maintained while enhancing the reliability and efficiency of data transfers in high-demand environments.

Finally, the Data Processing Functions 308 will now be described.

The Data Processing Functions 308 involve processing the dataframe before it is written to the target platform, focusing on the data at the object level and encompassing two main activities: (1) that data transformation occurs either during or immediately after data is read from the source, and the transformation is tailored to meet specific requirements before the data is forwarded to the target, and (2) data quality checks are conducted while the data resides in memory, which eliminates the need for repeated data retrieval from the source or target platforms, thereby improving the transfer system function by minimizing system load.

With respect to Item (1), the data transformation, this functionality enables various transformations at the object level by altering the dataset prior to its transfer to the target. Such transformations may include, for example, one or more of:

a) adding an additional column with a calculated value during data loading to the target object (e.g., row_insert_time), b) introducing a column with a pre-specified default value (e.g., 0, NULL, etc.), c) creating a new column that is derived from the values of other columns (e.g., using case statements), d) modifying the data type of a source column prior to transfer to the target (e.g., converting a timestamp to a date), e) changing the data types of all columns to a particular (different) data type (e.g., converting all columns with decimal(18,12) to decimal(20,10)), f) converting unsupported target data types to compatible data types through casting, and/or g) applying data masking or altering column values for personally identifying information (PII) and/or material non-public information (MNPI) data.

The foregoing transformations are merely examples and are optional, in that, advantageously, specific other transformations can be configured in lieu of, or in addition to one or more of the foregoing, as needed. Thus, the ability to apply transformations as data is transferred represents a significant departure from conventional approaches and, again, improves the operation of the transfer system.

The Data Processing Functions 308 aspect maintains a record of source and target columns so that, during the data transformation process, the configuration file's transformation section can match a field in the "key" from the source and replace it with the corresponding "value" in the target. For data type transformations, a separate section in the configuration file can be used to specify the source data types as "key" and the required casting as "value". For unsupported data types, for example, the DecFloat function in DB2 to decimal(X,Y) in Snowflake, the Data Processing Functions 308 aspect would employ a specific algorithm, maintaining the source and target data types in the configuration file. It would check the source catalog table to verify if the data type is present in the object Data Definition Language (DDL). If it is, the transformation would be applied to make the column value compatible for insertion into the target column.

A further advantage to the Data Processing Functions 408 aspect is that it can query a relevant repository's metadata to determine if any field in the source object contains PII/MNPI data. In such cases, various transformations, including masking or deriving values for that column, can be implemented to safely transfer this information to the target platform, for example by masking PII fields when moving the data to certain targets.

A further function of the Data Processing Functions 408 aspect is to conduct data quality checks.

With conventional system approaches, data quality checks are conducted at either the source or the target platform. However, the instant approach enhances efficiency by enabling in-flight data quality checks at the object level, i.e., data quality id checked during transfer through execution of queries defined in the configuration files.

More particularly, after the source data is read and a dataframe is created, the data to be transferred is temporarily stored in memory and then checked. This approach allows for multiple checks to be performed directly on the dataframe, to determine whether the source data is in a suitable condition to be transferred to the target platform. This method improves efficiency because it eliminates the need to repeatedly query the source or target to make that determination, which would degrade the source or target efficiency. For instance, instead of querying the source or target ten times for one object, requiring, among other things, use of source or target resources, with our approach the ten checks would be performed directly on the in-flight dataframe in memory, thereby eliminating the need to use resources of the source and/or target.

The outcomes of such data quality validations are advantageously useful in that they help to decide subsequent actions by, for example, confirming whether the data is ready to be loaded to the target, halting the transfer process if data quality issues are detected, excluding rows with errors (ensuring only the correct dataset is loaded to the target) and/or directing rows with errors to a separate "exception table" for further analysis and tracking.

As should therefore be appreciated, our approach streamlines the process while significantly reducing the load on the source and target systems.

Having described the various components and their operation, the capabilities of systems employing the teachings herein to optimize resource utilization and facilitate parallel data reading from source objects through metadata-driven configurations will now be described in conjunction with specific examples.

In view of the above, it should now be appreciated that the process flow essentially encompasses four phases:
1. Metadata Collection, involving, for batch processing, identification and recording of row size and count of the source object in metadata.
2. Resource Calculation, involving calculation of the necessary application resources at the object level by analyzing the data volume of the source batch and the availability of cluster resources.
3. Partition Column Identification, involving determining the appropriate partition column for parallel data reading, using a catalog table if a given column is not specified in the metadata.
4. Parallel Data Reading, involving the execution of parallel reads from RDBMS sources, which, in turn, involves calculating and setting a lower and upper boundary, a partition column, and a number of partitions for parallel read.

Metadata plays a crucial role throughout the system by tracking details such as resourcing and source data count. This structured tracking aids in the efficient management of resources and ensures that data processing aligns with the available infrastructure.

Regular auditing of the batch process provides the ability to assess the effectiveness of the resourcing strategy and aids in identifying areas where further adjustments may be desired or necessary to enhance performance for a specific implementation.

The four phases above will now be described in greater detail involving, for purposes of example only, representative examples in an environment employing Apache Spark as the "transfer application" 104.

Phase 1: Metadata collection through identification of the source object's row size and count.

This phase is integral to the batch processing workflow, focusing on accurately determining the row size and count for each source object.
1. Row Size Calculation:
    a. At the start of batch processing, a pre-process module is activated for each object to determine the row_size. If this attribute is not already specified in the metadata, the module proceeds to calculate it.
    b. If the row_size column in the metadata is not null, the pre-existing value is directly used for the corresponding object.
    c. If the row_size column is null, a wrapper, in the case of Spark a PySpark wrapper, with the default Spark configurations is deployed to compute the row size in kilobytes (KB). This computation is based on the top 10,000 rows of each object as listed in the metadata. The row size is then calculated by dividing the total size value by 10,000. If the size is less than 10,000, the total count is fetched and divided by that count value. For objects with a count of zero, the metadata value is intentionally kept null to reflect the absence of data.

This process is typically a one-time activity using Spark. Once the row_size is calculated and stored in the metadata, subsequent processes can skip the size calculation step.
2. Source Count Acquisition:
    a. Following the row size determination, the next step involves retrieving the source count for all listed tables. This is achieved using a Python connector to interface with the particular RDBMS source. The retrieved counts are then accurately inserted into the metadata column labeled source_count. Additionally, the data size corresponding to each object is calculated by multiplying row_size and source_count and the result is stored in the metadata as data_size against each object. Next, using the row_size and source_count values from the metadata, the total memory requirement for each table's batch data is calculated using the row_size and source_count values.

Upon completion of these steps, the framework transitions to Phase 2, which focuses on identifying and allocating object-level resources based on the data gathered in Phase 1. This ensures that the system is prepared with the necessary information to optimize resource allocation effectively in subsequent phases.

Phase 2: Identifying and Allocating Object-Level Resources

In this phase and example, the framework focuses on determining the necessary Spark resources for the entire batch process, considering the specific requirements for parallelism between the source and target platforms.

Upon obtaining the data size from metadata for each table, the next critical step involves identifying the total resource requirements for the batch. This is informed by user-specified parameters, which must be specified in the configuration file, for example:

Total Memory Availability: The aggregate memory available for processing the entire batch across all objects from both the RDBMS source and target platforms, for example, 50 GB.

Total Connections at the Source Platform: The maximum number of concurrent data movement connections that can be established at the source platform, for example, for a particular DB2 source platform, 20 connections.

Total Connections at Target Platform: The maximum number of connections allowed at the target platform, for example, for a particular Snowflake target platform, 100 connections.

Total Cores for Batch Ingestion: This will typically be set to match the maximum number of source or target connections to ensure adequate processing power, thus, with the current example, 100 cores.

At this point it should be noted that adjustments may need to be changed based upon core availability. For example, if the number of available cores is less than the maximum number of connections, the number of connections will need to be readjusted to align with the available resources. In other words, with the above example, if the number of available cores was only 80 cores, the maximum number of target platform connections would need to be reduced to 80 connections, even though was actually 100 connections.

The use of these parameters stems from expected/potential operational necessities that may be present in a particular implementation. The reason(s) for this approach, continuing with the above example may be because, for example, the Spark cluster owned by the application may concurrently run other processes, so it is important to define the maximum resources the batch processing can utilize such that they will not interfere with other ongoing operations, or both the source and target platforms might be engaged in other application processes, in which case it is important that the maximum connections is specified so as to ensure efficient data reading can occur without disrupting operations on either system.

With the necessary information gathered from metadata as part of the batch ingestion process, an algorithm is applied to determine the resource allocation for each object. The algorithm is best understood through an example as follows in an example parallel processing configuration with user-declared metadata parameters are as follows:

Maximum Memory usable for batch processing=50 GB
Maximum source connections=20
Maximum target connections=100
The total cores utilized at maximum batch processing confirmed to be 100

This structured approach ensures that the resource allocation is optimized based on user input and system capabilities, facilitating efficient parallel processing while maintaining system integrity and performance. As the process progresses, the logic for identifying and allocating resources, in this example, Spark resources, on a table-by-table basis is implemented as follows:

1. Metadata Querying and Ordering

A pre-process module queries the metadata to retrieve data size information for all tables. The result set is then organized in descending order based on data size to prioritize tables with the largest data volumes.

2. Queue Width Determination

A user defined parameter, queue_width, is used and represents the number of tables that can be processed in parallel. By dynamically adjusting the number of tables to be processed in parallel, the framework optimizes throughput and enhances overall batch processing efficiency.

User-Specified Minimum Queue Width: The user specifies the minimum queue_width that the process can utilize. This value sets the baseline for the number of tables that the system attempts to process concurrently.

Memory Summation Check: The process evaluates the ordered list of tables for the top queue_width number of tables to determine if the combined memory requirement, multiplied by 1.5, exceeds the total memory available. This calculation accounts for buffer memory and follows the minimum and maximum memory calculation logic in this implementation. If the combined memory requirement of the queue_width number of tables is greater than or equal to the total memory available, the process proceeds with the user-specified minimum queue_width value.

Adjusting Queue Width Based on Memory Availability: If the combined memory requirement for the queue_width number of tables, each multiplied by 1.5 as a buffer, is less than the total memory available, the process evaluates the potential to accommodate additional tables for parallel processing. This evaluation involves incrementally adding 1.5 times the data size of each subsequent table in the ordered list to the cumulative memory requirement of the preceding tables. The process continues to assess each table iteratively until adding another table would exceed the total available memory. If adding 1.5 times the data size of the next table exceeds the available memory, the process then checks if adding just 1 times the data size of that table can still fit within the available memory constraints. If it can, the queue_width is adjusted to include this table at 1× its data size; if not, the queue_width remains unchanged with the last successfully added table at 1.5× its data size. This approach ensures that the final queue_width value reflects the maximum number of tables that can be efficiently processed within the available memory resources, maximizing resource utilization while accommodating the largest possible data volume.

Note on Maximum Queue Width: The maximum queue_width is constrained by the connectivity limits to the source or target platforms. This is formally expressed as:

$$\text{Max queue\_width} = \min(\text{number of source connections}, \text{number of target connections}).$$

This formula ensures that the number of tables processed in parallel does not exceed the available connections at the source or target, thereby maintaining system integrity and preventing over-utilization of network resources.

For purposes of this example, presume that the final queue_width value determined by the process is "3."

3. Initial Table Selection and Memory Validation

First, the multiprocessing module (typically written in Python) initiates processing for the top three tables, as per the determined queue_width value, based on size.

Note here that the processing based upon size, i.e., from heaviest table on down, is optional, and provides the greatest advantages. However, this processing order is not a requirement and some implementations may choose to use a different ordering, for example, based upon the particular source/target combination or the time of day or the nature of the tables (e.g., the need for certain security protocols or the presence of certain amounts of PII/MNPI contents).

For each table in the ordered list, memory requirements are evaluated up to the set queue_width. Each table is checked to see if 1.5× its data size can be accommodated (within 50 GB as per the total memory usage parameter). If it can, the process moves to the next table. If 1.5× cannot be accommodated but 1× can, that table's memory requirement is accepted at 1×, and all subsequent tables are marked as 'P' (pending), indicating limited processing capacity despite the user-defined queue_width. This evaluation continues until the queue_width number of tables is assessed or adjustments are made based on memory constraints.

If the combined memory requirement for the evaluated top three tables (T1, T2, T3) is within the 50 GB (as per the total memory usage parameter), these tables are marked as 'R' (running) in the metadata and are processed in parallel.

4. Memory Allocation for Each Table

For purposes of illustration, presume that, based upon multiplying those two values for each table T1, T2, T3:

T1: Has data size 12 GB,
T2: Has data size 10 GB, and
T3: Has data size 10 GB.

The framework allocates memory for each table with a minimum value of 1× and a maximum of 1.5× the calculated requirement. For the last table in the queue, if 1.5× of its data size exceeds the available memory, the maximum memory allocated is adjusted to the remaining available memory, while the minimum remains at 1×. As a result, the memory allocations are:

T1 Allocated: 12 GB to 18 GB,
T2 Allocated: 10 GB to 15 GB, and
T3 Allocated: 10 GB to 15 GB.

Based upon those allocations, the total minimum memory for the three tables adds up to a minimum of 32 GB, while the maximum can reach up to 48 GB which is lower than the total available memory, ensuring that the allocation does not exceed the system capacity. Spark can intelligently distributes the memory between these lower and upper limits to optimize resource usage. For transfer applications 104 other than Spark, the total memory allocation can be similarly managed by the transfer application or set so that total memory used does not exceed the maximum.

5. Source and Target Parallelism Configuration

Although, as noted above, 100 cores are available, the maximum number of connections at the source is limited to 20. Therefore, the source parallelism for each of the three tables is calculated based on a percentage of each of their data size, while aiming to fully utilize all 20 connections. As a result, T1 would get 8 connections, T2 would get 6 connections and T3 would get 6 connections.

In contrast, the target parallelism as specified in the configuration at 100 connections. Thus, after data is read from each source, the data frames are repartitioned to create a total of 100 connections, and are distributed again in proportions to their respective data sizes as follows:
  T1: 40 partitions,
  T2: 30 partitions, and
  T3: 30 partitions.

6. Validation and Spark-Submit Preparation

Validation checks are then performed to ensure that the total cores used matches the maximum value of connections from either the source or the target. In addition, further validation is done to confirm that the total memory allocated (50 GB) is at least equal to 1× the memory required by the table with the heaviest dataset.

At this point it is worthwhile to mention that a good practice, for many implementations, is to have more memory available in the cluster compared to the batch data size-ideally 1.5 times the data size, although this buffer is not a requirement. The Metadata Audit Table 404 is utilized to monitor batch performance trends at each object level in conjunction with the allocated Spark resources. This allows for adjustments to be made to the transfer application's 104 configuration parameters to further enhance batch processing efficiency.

7. Executing Spark-Submit

The final steps involve setting up and executing the Spark-submit commands for each object using dynamically allocated resources based on the calculated parameters. This provides for the optimal use of the cluster's capabilities while being tailored to the specific needs of each table. Continuing with the example, the Spark-Submit Parameters Configuration for the three tables (with the number of executors are calculated based on [Total Cores]/5) are:

For the T1 Object:
  a. Total Cores: 40,
  b. Number of Executors: Calculated as 40/5=8,
  c. Executor Memory Range: Minimum 12 GB, Maximum 18 GB,
  d. Source Parallelism: 8, and
  e. Target Parallelism: 40.

For the T2 Object:
  a. Total Cores: 30,
  b. Number of Executors: Calculated as 30/5=6,
  c. Executor Memory Range: Minimum 10 GB, Maximum 15 GB,
  d. Source Parallelism: 6, and
  e. Target Parallelism: 30.

For the T3 Object:
  a. Total Cores: 30
  b. Number of Executors: Calculated as 30/5=6
  c. Executor Memory Range: Minimum 10 GB, Maximum 15 GB
  d. Source Parallelism: 6
  e. Target Parallelism: 30

All the above parameters are recorded in the Metadata Detail Table 402 for the current batch. Subsequently, spark-submit is triggered for each application, ensuring that each table is processed according to its specific resource allocation.

Another advantage of our approach is dynamic queue management and management of memory availability. These will now be discussed, again, with continuation of the above example.

Assuming the first batch runs smoothly, it is possible that one of the tables (e.g., T3) may complete its processing while the processing of T1 and T2 are still in progress. Nevertheless, advantageously, once T3 completes, the next table in the queue (T4) can be considered for processing, even though T1 and T2 are still processing.

Accordingly, the available memory for T4 is calculated based on the minimum and maximum memory values assigned to T1 and T2:

As such, the available Maximum Memory is the total memory minus the sum of the minimum memory for T1 and T2: 50 GB−(12 GB+10 GB)=28 GB. Likewise, the available Minimum Memory is 50 GB−(18 GB+15 GB)=17 GB. There are also two possible scenarios for T4 processing depending upon whether T4 size is less than or equal to 17 GB or is greater than 17 GB. In this example we know that the data size for T4 will be less than or equal to the data size of T3 given the list of tables was ordered, thus the data size of T4 will be less than or equal to 10 GB.

As a further improvement to the processing efficiency, systems implementing the teachings herein can dynamically adjust to accommodate the processing of, e.g., T4, based upon the available memory and size of T4.

For purposes of this continued example, presume that the source object data size for T4 is 9 GB. Thus, T4's size is less than the 17 GB minimum memory available.

Based on the memory allocation strategy of 1× to 1.5× and proportional source/target parallelism compared to T1 and T2, the following parameters are calculated for T4:
  Executor Memory Allocated: (9 GB out of 17 GB),
  Maximum memory=min (Available memory, 1.5× table size)=min (17 GB, 13.5 GB)=13.5 GB,
  T4 memory percentage among T1, T2 and T4=29%,
  The source parallelism for T4 is: 5 (i.e., 29% of total 20 connections), and
  The target parallelism for T4 is: 29 (29% of total 100 connections).

Accordingly, the T4 Object's spark-submit parameters with Source/Target Parallelism would be:
  Total Cores: 20,
  Number of Executors: Calculated as 20/5=4,
  Executor Memory with Min/Max Value: (9 GB, 13.5 GB),
  Source Parallelism: 5, and
  Target Parallelism: 29.

As a result, under the foregoing scenario, T4 can be processed immediately due to the availability of sufficient resources, thereby ensuring efficient utilization of the cluster. Tables being processed are marked with an "R" (running) status in the Metadata Detail Table 402.

For purposes of this continued example, now presume that the source object data size for T4 was greater than the available memory. In such a case, the resource requirements would exceed the available maximum memory. As a result, the following steps would be taken:

Table Status: T4 is immediately marked in the Metadata Detail Table 402 as "P" (pending). This status indicates the table cannot currently be processed due to insufficient resources and is skipped from processing. As a result, the next table in the list, e.g., T5, is validated to check if it can be considered for batch processing based on available resourcing. If so, T5 is processed in the manner described immediately above for T4.

In addition, an entry for T4 is made in the Metadata Audit Table 404. This action specifies that the resources allocated are inadequate for processing T4. This entry can also help IT personnel track issues and plan resource adjustments as necessary.

Similarly, if any other table(s) in the batch require(s) more resources than what is currently allocated and available when they come up for processing, the status for each will also be marked as "P". These P-marked tables are skipped in the current processing cycle to prevent resource contention and system overload, but the process continues for each of the tables in the list thereafter that can actually be processed. Note here that as the processing of some tables completes, resources will be freed up.

Once all tables marked with an "R" (running) status have been processed, the system then re-evaluates the tables that were marked with a "P" status. This step thereby allows for processing of pending tables as resources become available, again, in distinct contrast to conventional approaches where tables are transferred serially and, if a table could not be transferred due to a lack of available resources, the entire transfer process would terminate.

The pending ("P" status) tables are then processed based on their data size in descending order. The system therefore assigns an "R" status to them and begins processing as described above, starting with the heaviest table. This prioritization, although optional, ensures that the most significant data tables are addressed first.

If, during this first re-evaluation pass, the memory available is still insufficient for the next table, it remains in "P" status and is skipped again, with the next table in the list being processed, until all remaining tables in the list have run or are in "P" status. If, at the end of the second pass, there are still "P" status tables, the list of remaining table is re-evaluated yet again. This cycle of re-evaluation continues until either sufficient resources become available or all feasible tables are processed.

In general, implementing of regular monitoring and reporting mechanisms, based on the data in the Metadata Audit Table 404 is recommended because it can help identify resource allocation trends and/or pinpoint recurring resource shortages. Advantageously, the insights gained from the reports can be used to inform decisions, for example, on increasing cluster resources or adjusting resource allocations. Such a proactive approach can help with accommodating growing data volumes and/or preventing processing delays.

Phase 3: Identification of Partition Column with Datatype

This phase is for identifying the appropriate column for parallel data read, which is important to optimizing data processing efficiency. In this phase, as the Spark-submit application is triggered for each object, based on the previously calculated resourcing, the process proceeds with a Spark read on the source data.

Partition Column Identification
1. Direct Metadata Reference

If a partition_column is specified in the metadata, this column is directly used to identify the lower and upper limits of data for a given batch for parallel reading through the Spark reader API. This straightforward approach ensures that the data read operation is aligned with predefined partitioning strategies.

2. Catalog Table Query for Partitioning Information

This step aids in determining whether inherent partitioning already exists and can be leveraged for parallel processing.

a. If the partition_column is not mentioned in the metadata, the framework will dynamically identify a suitable column by querying catalog tables of the source server. This may involve further checks to determine the datatype of the column.

b. If the identified column is not of a timestamp datatype, date datatype, or integer datatype, the framework checks for a primary key index and performs a parallel read using the RANKING method.

c. If the column is of a timestamp datatype, date datatype, or integer datatype, the framework proceeds by identifying the lower and upper bounds and applies parallel read on the source object via the Spark API.

3. Handling of Non-Partitioned Tables a. For tables that are not partitioned and do not have a primary key index, the dataset is typically read using a single thread. Use of this approach can help ensure data integrity and processing stability, albeit at a lower efficiency.

b. If the table has a primary key, the framework performs a parallel read, using a ranking function, ordered by primary keys. An extra RANK column can be temporarily added to facilitate this process, and if done, it is removed from the dataframe once the data has been read in parallel.

For tables with multiple partition columns, the framework can evaluate the distinct values of each partition key. In such a case, the column with the most distinct values can be considered to take precedence, as doing so offers greater granularity and potential for efficient data distribution.

At this point it should be noted that, in implementation variants using Apache Spark, there may be scenarios where data skewness (i.e., where the data being processed is not distributed evenly across partitions) might affect performance. In such scenarios, the framework would rely on the Spark read API's adaptive query execution feature, which dynamically adjusts query plans based on runtime data statistics to thereby optimizing performance even in the presence of data skew. Other implementation variants having different applications as the transfer application 104 can use a similar or analogous approach, if available.

Phase 4: Application of Parallel Read

In this final phase, the focus is on efficiently utilizing the allocated cores for reading data from the source object. This involves strategically managing the parallelism based on the identified partition columns and their corresponding lower and upper bounds.

Optimizing Parallel Reads:
1. Core Utilization and Parallel Connections a. The number of partitions that the source data is read in will ideally be equal to the number of parallel connections to the source for that object (source parallelism).

b. The number of partitions the data written into the target will ideally be equal to the number of parallel connections to the target for that object (target parallelism).

c. With this approach, optimally, the total number of cores allocated to the object (equal to the max [source parallelism, target parallelism]) will be used. This is because, if the number of partitions exceeds the number of allocated cores, multiple iterations may be needed to read the data completely. It is to be understood that, while this approach helos ensures data completeness, it might lead to some performance degradation due to the increased number of read cycles. In contrast, if the number of partitions is less than the number of allocated cores, the read operation proceeds with the minimum cores needed (i.e., equal to the number of partitions). However, this can lead to suboptimal use of the remaining cores, since they will remain idle throughout the process.

2. Handling Data Skewness and Core Distribution

As a further note, there may be instances where, for example, despite allocating 10 cores, the data might be overly concentrated in just 2 cores, for example, due to the distinct values held by the partition column. This uneven distribution can lead to data skewness and idle cores, which could increase the overall read timing. In such cases, in the case of Apache Spark, its Adaptive Query Execution (AQE) property can be applied to maintain uniformity across partitions and optimize performance. Again, for other implementation variants having different applications as the transfer application 104, a similar or analogous approach can be used, if available.

3. Optimization of Fetch Size

Optionally, depending on the source platform, with some implementation variants, the fetch size can advantageously be overwritten to increase overall throughput. This adjustment can help in optimizing the data transfer rates and improving the efficiency of the read process.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. It should be understood that they are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. A method of dynamically optimize allocation and utilization of system resources to efficiently transfer data between a source Relational Database Management System ("RDBMS") and a target RDBMS, the method comprising:
   i) collecting metadata regarding object data from the source RDBMS;
   ii) calculating, on an object-level basis, a necessary amount of resources needed to perform a parallel reading objects from the source RDBMS based upon a volume of data to be read;
   iii) calculating on an object-level basis, a necessary amount of resources needed to perform a parallel writing of objects to the target RDBMS;
   iv) creating an index, on an object-level basis, of tables to be transferred from the source RDBMS, with the tables being ordered for processing and transfer on a heaviest to lightest basis;
   on a first pass,
      a) executing parallel reads of object-level table data from the source RDBMS based upon the ordering in the index; and
      b) if sufficient resources are available, transferring the tables on a parallel write basis to the target DBMS, and
      c) if sufficient resources are not available for a particular table identified in the index, marking the particular table as having a pending status for processing in a subsequent pass and skipping the particular table by advancing to a next heaviest table listed in the index;
   v) performing DataFrame transformation on source DataFrames for objects of the source RDBMS to be transferred to the target RDBMS; and
   repeating steps "a)" through "c)" and "v)" until all data that can be transferred to the target RDBMS has been transferred.

2. The method of claim 1 wherein following a completion of the first pass, if at least one table is listed in the index as having a status of pending, the method includes:
   re-evaluating each table listed in the index as having the status of pending on a heaviest to lightest basis by repeating "a)" through "b)".

3. The method of claim 1 wherein step "b)" further comprises, marking the tables in the index with a running status as each of the tables is processed.

4. The method of claim 1 further comprising:
   calculating a number of tables that can be processed in parallel.

5. The method of claim 1 further comprising:
   dynamically adjusting a number of tables that can be processed in parallel based upon current memory availability.

6. The method of claim 1 further comprising:
   storing information in a Metadata Detail Table including at least information necessary to perform object-level batch ingestion of data from the source RDBMS along with commit point and batch intervals.

7. The method of claim 6 further comprising:
   storing information in a Metadata History Table including at least a before and after state of rows updated in the Metadata Detail Table.

8. The method of claim 1 further comprising:
   storing information in a Metadata Audit Table including at least auditing information for object-level batch processing along with source and target level information.

9. The method of claim 1 further comprising:
   creating a configuration file containing resource-related information for use in the calculating of "ii)" and "iii)" including one or more of
   a maximum memory usable for batch processing,
   a maximum number of source connections,
   a maximum number of target connections, and
   a total number of system cores that can be used a maximum batch processing.

* * * * *